United States Patent
Culek et al.

(10) Patent No.: US 12,054,045 B1
(45) Date of Patent: Aug. 6, 2024

(54) TRACTION CONTROL FOR ALL-WHEEL DRIVE VEHICLES

(71) Applicant: FORD GLOBAL TECHNOLOGIES, LLC, Dearborn, MI (US)

(72) Inventors: Kyle Culek, Birmingham, MI (US); Cameron Dillon, New Hudson, MI (US); Nithesh Maddi Reddy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/490,064

(22) Filed: Oct. 19, 2023

(51) Int. Cl.
| | |
|---|---|
| *B60K 28/16* | (2006.01) |
| *B60K 23/08* | (2006.01) |
| *B60W 30/02* | (2012.01) |
| *B60W 40/064* | (2012.01) |

(52) U.S. Cl.
CPC ......... *B60K 28/16* (2013.01); *B60K 23/0808* (2013.01); *B60W 30/02* (2013.01); *B60W 40/064* (2013.01); *B60W 2520/14* (2013.01); *B60W 2520/26* (2013.01); *B60W 2520/28* (2013.01)

(58) Field of Classification Search
CPC ............... B60K 28/16; B60K 23/0808; B60W 30/02; B60W 40/064; B60W 2520/14; B60W 2520/26; B60W 2520/28
See application file for complete search history.

(56) References Cited

U.S. PATENT DOCUMENTS

| | | | |
|---|---|---|---|
| 5,737,714 A | 4/1998 | Matsuno et al. | |
| 7,222,014 B2 | 5/2007 | Tao et al. | |
| 10,538,227 B2* | 1/2020 | Boethel | ............ B60T 8/268 |
| 11,273,833 B2 | 3/2022 | Lian et al. | |
| 2003/0151302 A1* | 8/2003 | Anwar | ............ B60T 8/17616 |
| | | | 303/112 |
| 2018/0201129 A1* | 7/2018 | Coerman | ............ B60W 30/045 |
| 2020/0290625 A1* | 9/2020 | Berntorp | ......... B60W 30/18172 |

FOREIGN PATENT DOCUMENTS

CN          113147420 A   *   7/2021

* cited by examiner

*Primary Examiner* — Justin Holmes
(74) *Attorney, Agent, or Firm* — Brooks Kushman P.C.

(57) ABSTRACT

A method of controlling torque in an all-wheel-drive vehicle limits the duration of loss of traction. During wheel slip events, a controller reduces the commanded torque from a driver demanded level. The controller calculates a normalized wheels speed for each wheel based on a measured yaw rate, measured wheel speeds, and calculated wheel diameters. The controller determines the end of the wheel slip event by comparing the normalized speeds of each while to one another.

18 Claims, 6 Drawing Sheets

TRACTION CONTROL FOR ALL-WHEEL DRIVE VEHICLES

TECHNICAL FIELD

The present disclosure relates to vehicle control. More particularly, the disclosure relates to controlling an all-wheel drive vehicle during periods of reduced or intermittent traction.

BACKGROUND

Ground vehicles, like automobiles, are propelled by directing torque from a torque source, such as an electric drive unit or an internal combustion engine and geared transmission, to driving wheels. Intervening components, such a differentials, may divide the power such that multiple wheels are driven. Alternatively, multiple torque sources may independently drive each axle or each wheel. When there is plentiful friction between the wheels and the surface, a large amount of propulsive force can be applied with a small degree of slip. However, when friction is limited, attempting to apply too much torque results in the wheel speeding up without the vehicle speeding up. This wheel slip condition can result in excessive wheel speeds, reduced vehicle controllability, and reduced propulsive force than what is possible when wheel speed is matched to vehicle speed.

Many vehicles are equipped with traction control which limits the torque that is applied to the driven wheels when wheel slip is detected. Controlling the amount of wheel slip requires a way for a controller to calculate a wheel slip value. The effectiveness of the traction control feature is degraded if the calculated wheel slip differs from the actual degree of wheel slip. In two-wheel drive vehicles, wheel slip may be calculated by using the non-driven wheels to measure vehicle speed under the assumption that the non-driven wheels are not slipping.

SUMMARY

In a first embodiment, a method controls torque in a vehicle. Torque is distributed from at least one torque source to all wheels of the vehicle. A commanded torque level of the at least one torque source is based on a driver demanded torque. In response to detecting wheel slip, the commanded torque level is reduced and controlled based on a degree of wheel slip. A normalized speed of each wheel is computed based on a measured rotational speed of each wheel. In response to a difference between a greatest normalized wheel speed and a least normalized wheel speed being less than a threshold, the commanded torque level is increased to the driver demanded torque. The normalized speed of each wheel may be computed by measuring a yaw rate and adding or subtracting a term proportional to the yaw rate to each measured wheel speed. The term may also be based on a lateral distance between the respective wheel and a point about which the yaw rate is measured. Computing the normalized speed of each wheel may also include multiplying by a factor that is based on a sensed diameter of the respective wheel. In response to detecting absence of wheel slip, the sensed diameters may be updated based on the measured rotational speeds. A controller may wait until the difference between the greatest normalized wheel speed and the least normalized wheel speed remains less than the threshold for a duration before increasing the commanded torque level to the driver demanded torque. The duration may be adjusted in response to vehicle settings, driving conditions, and vehicle dynamics.

In a second embodiment, a method controls torque in a vehicle. Torque is distributed from at least one torque source, wherein a commanded torque level of the at least one torque source is based on a driver demanded torque. In response to detecting wheel slip, a vehicle speed estimate is updated, the commanded torque level is reduced, and a normalized speed of each wheel is computed. The vehicle speed estimate is updated based on a signal from an accelerometer. The commanded torque level is reduced and controlled based on a difference between an average of measured wheel rotational speeds for each wheel and the vehicle speed estimate. The normalized speeds are computed based on the measured rotational speed of the wheel. In response to a difference between a greatest normalized wheel speed and a least normalized wheel speed being less than a threshold, the commanded torque level is increased to the driver demanded torque. Computing the normalized speed of each wheel includes measuring a yaw rate and adding or subtracting a term proportional to the yaw rate to each measured wheel speed. The term may also be based on a lateral distance between the respective wheel and a point about which the yaw rate is measured. Computing the normalized speed of each wheel may also include multiplying by a factor that is based on a sensed diameter of the respective wheel. In response to detecting absence of wheel slip, the sensed diameters may be updated based on the measured rotational speeds.

A vehicle includes a torque source, four wheels, gearing configured to distribute the torque to the four vehicle wheels, and a processor. The processor is programmed to command the torque source to produce a torque level based on a driver demand. In response to detecting wheel slip, the processor reduces the commanded torque level and controls the commanded torque level based on a degree of wheel slip. The processor computes a normalized speed of each of the four wheels based on a measured rotational speed of each wheel. In response to a difference between a greatest normalized wheel speed and a least normalized wheel speed being less than a threshold, the processor increases the commanded torque level to the driver demanded torque. The processor may be further programmed to wait until the difference between the greatest normalized wheel speed and the least normalized wheel speed remains less than the threshold for a duration or distance before increasing the commanded torque level to the driver demanded torque. The duration may be adjusted in response to vehicle settings, driving conditions, and vehicle dynamics.

DETAILED DESCRIPTION

Detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
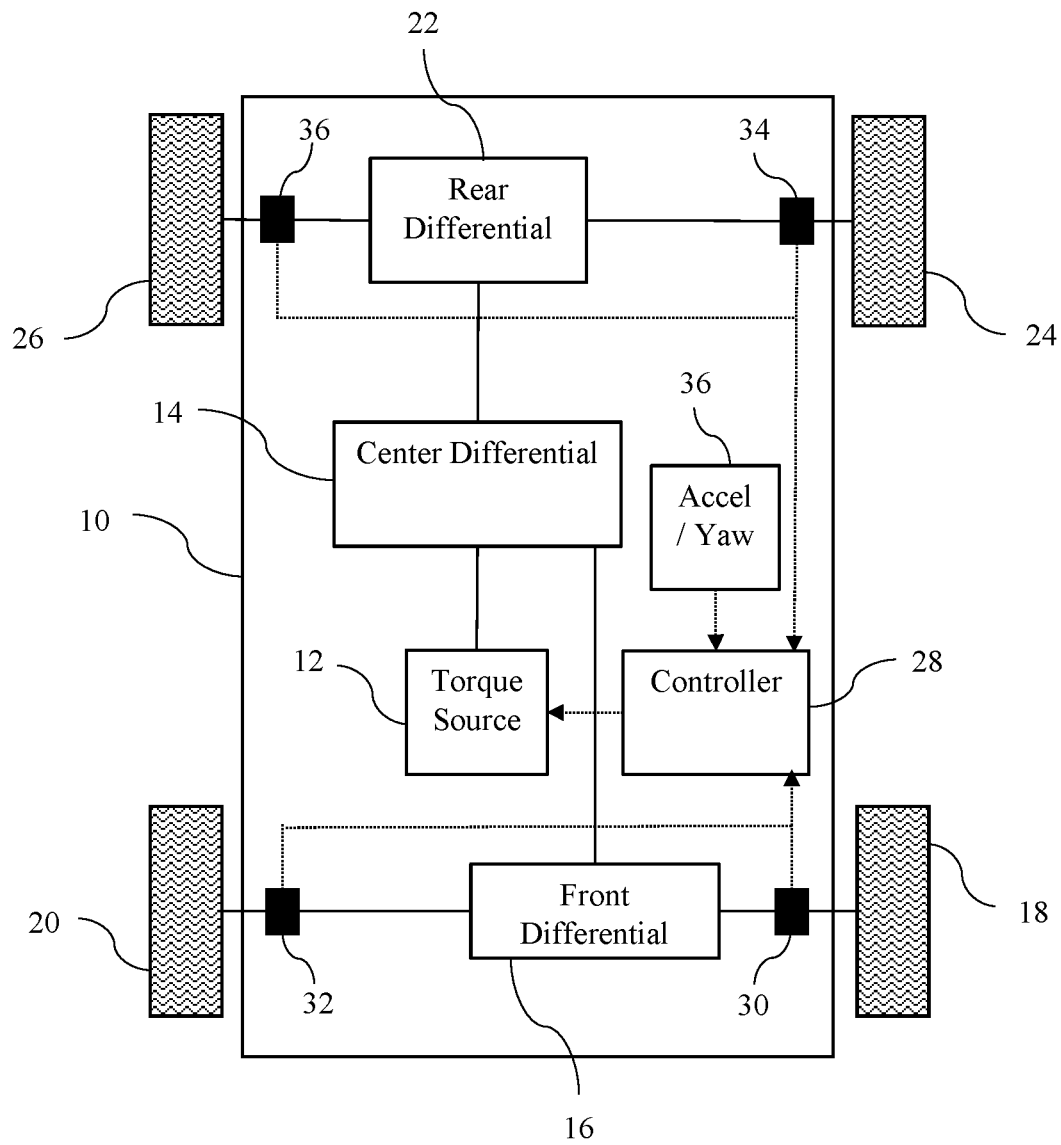
FIG. 1A illustrates a block diagram of first vehicle.

FIG. 1A schematically illustrates a first All-Wheel Drive (AWD) vehicle 10. Torque for propelling the vehicle is generated by a torque source 12. The torque source may be, for example, an internal combustion engine or an electric motor. The torque source may also include fixed or variable gearing, such as a transmission. The torque is transmitted to a center differential 14 which divides the torque between the front wheels and the rear wheels. Power directed to the front wheels is further divided by front differential 16 between left front wheel 18 and right front wheel 20. Power directed to the rear wheels is further divided by rear differential 22 between left rear wheel 24 and right rear wheel 26. A differential divides torque between two output shafts but does not constrain the relative speeds of the output shafts. The speed of the input shaft is proportional to an average speed of the output shafts. Some differentials include torque multiplication gearing in addition to the torque division gearing. Typically, the front wheels are steerable while the rear wheels are not.

A controller 28 adjusts the torque output of torque source 12 based on inputs from a number of sensors. These sensors include wheel speed sensors 30, 32, 34, and 36 associated with wheels 18, 20, 24, and 26 respectively. The wheel speed sensors measure the rotational speed of a shaft to which the wheel is attached. The sensors also include at acceleration and yaw sensors 36. The sensors are configured to provide information from which the controller can determine a longitudinal acceleration rate (forward or backward), and a yaw rate (turning). The sensors connected to controller 28 may include other sensors not shown on FIG. 1A, such as a steering angle sensor, pedal position sensors, etc.

Figure 1B:
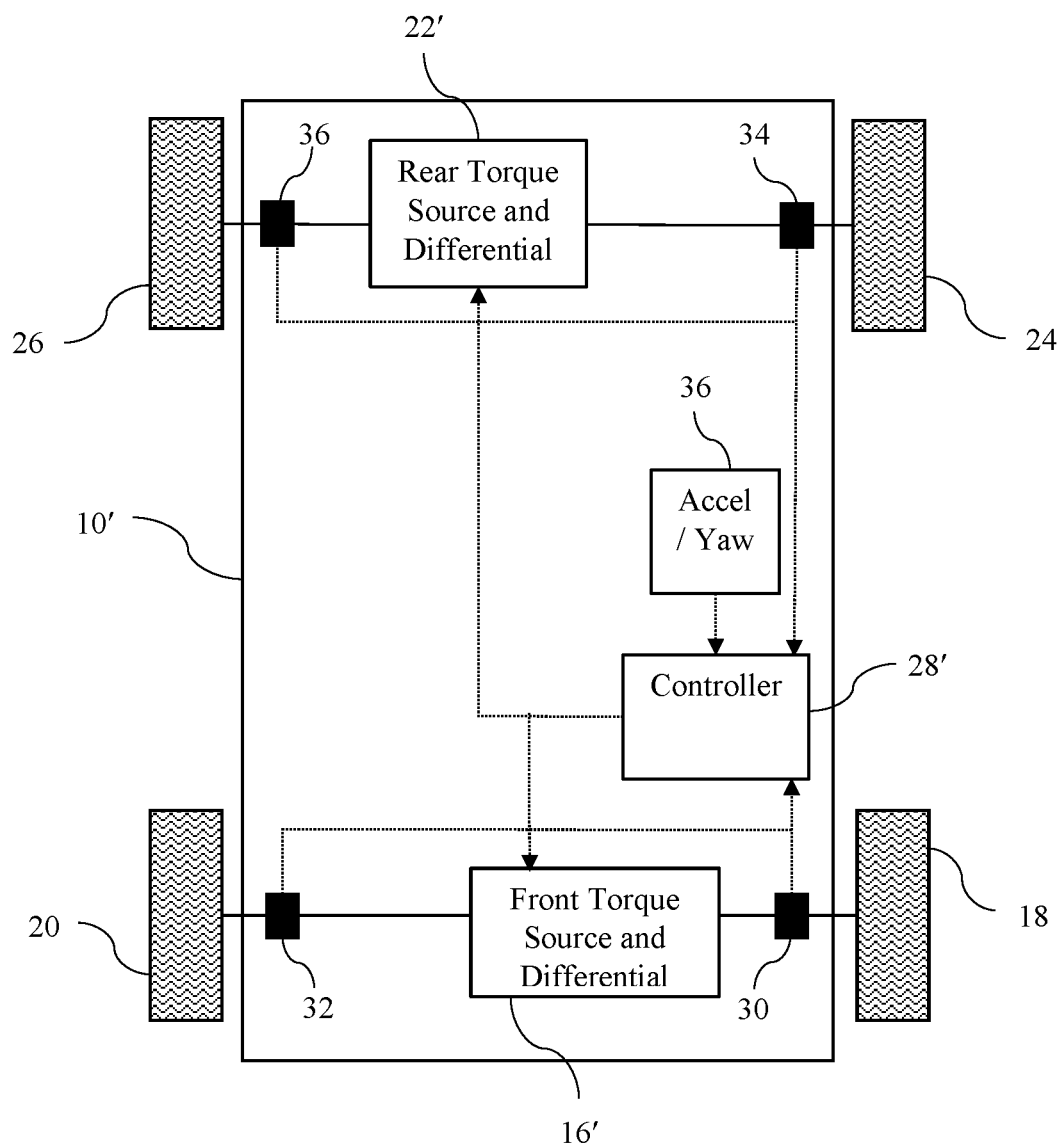
FIG. 1B illustrates a block diagram of second vehicle.

FIG. 1B schematically illustrates a second All-Wheel Drive (AWD) vehicle 10'. In this vehicle, the front differential 16' and the rear differential 22' include torque sources. These two torque sources are independently controllable based on signals from controller 28'. Otherwise, the vehicle of FIG. 1B is similar to the vehicle of FIG. 1A.

In an all-wheel drive vehicle, such as the vehicles of FIGS. 1A and 1B, there are no non-driven wheels that can provide a good estimate of vehicle speed during wheel slip conditions. An alternative way of estimating vehicle speed is to update the vehicle speed estimate at regular time intervals based on the measured longitudinal acceleration. Unfortunately, any errors that may be present tend to accumulate during the wheel slip event, such that the estimated vehicle speeds tends to drift away from the actual vehicle speed.

During a wheel slip event, each torque is controlled according to the average wheel slip of the wheels corresponding to the torque source. (Some wheels may be slipping more than others.) The average wheel slip may be calculated by subtracting the vehicle speed, converted to an equivalent rotational speed based on a wheel diameter, from the average wheel speed. If the estimated vehicle speed is greater than the actual vehicle speed, the calculated wheel slip is less than the actual wheel slip. Conversely, if the estimated vehicle speed is less than the actual vehicle speed, the calculated wheel slip is greater than the actual wheel slip. In this condition, even when traction is recovered on all wheels and actual wheel slip is minimal, the controller may continue limiting the torque based on the calculated wheel slip.

Figure 2A:
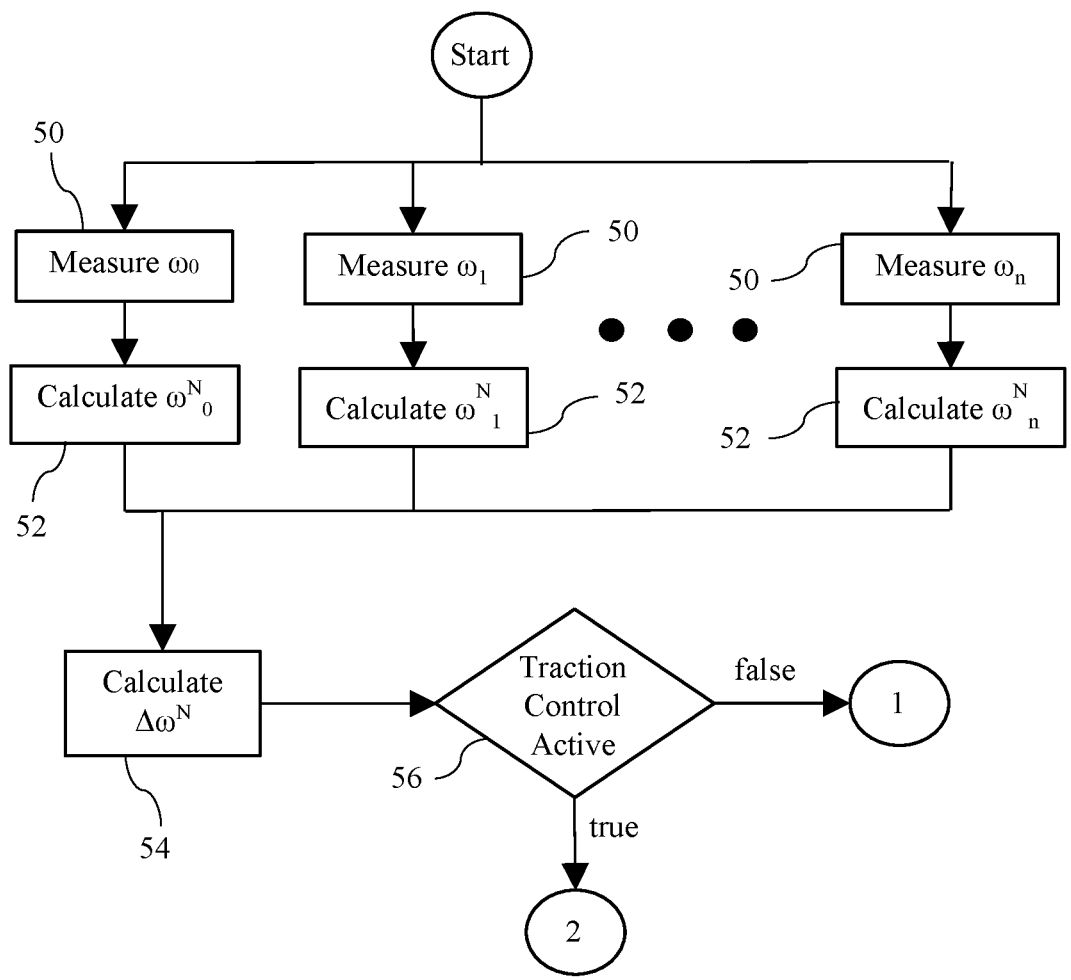
FIGS. 2A, 2B, and 2C are a flowchart for a method to control torque from a torque source according to a driver demand when traction is good and to maximize tractive force when wheels are slipping.
Figure 2B:
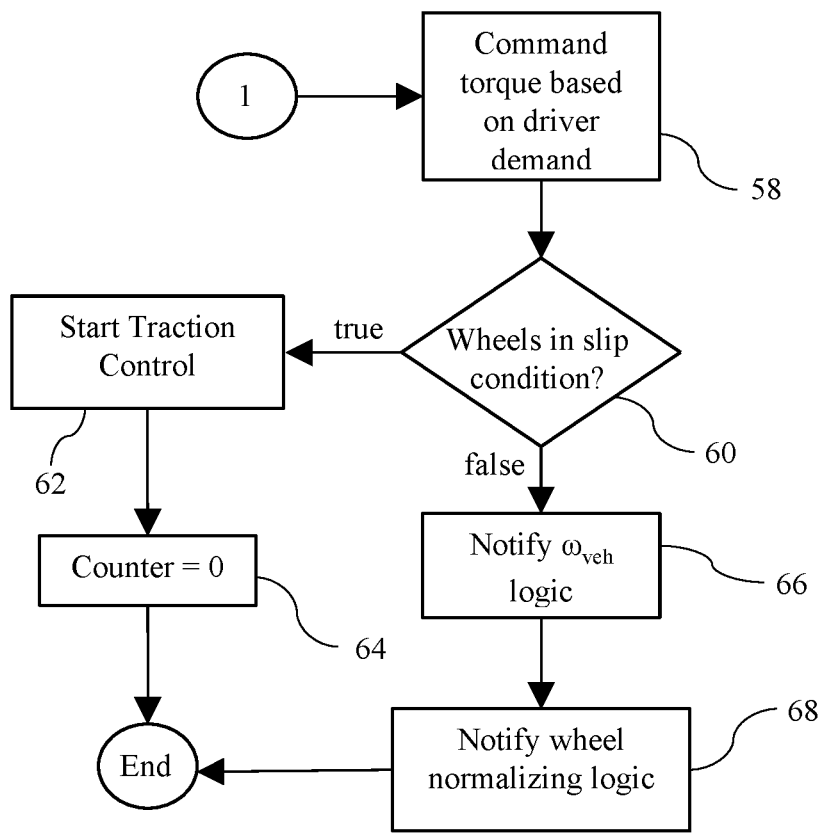
Figure 2C:
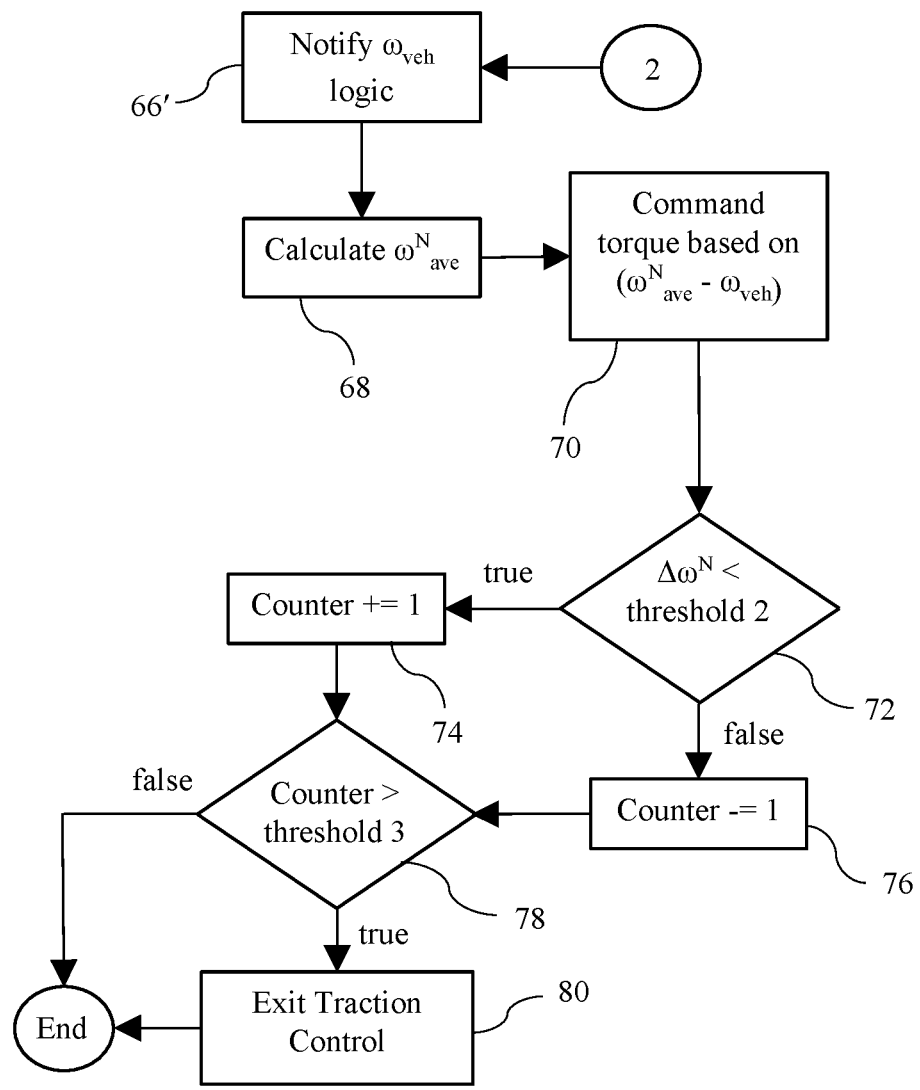

FIGS. 2A-2C provide a flow chart for a traction control method executed by the controller. This method is executed on a periodic basis, such as in response to interrupts that occur every 100 ms. Some information, such as whether or not traction control is active, and the estimated vehicle speed, is saved in memory between executions.

FIG. 2A describes operations that occur regardless of whether traction control is active or not. At 50, the controller reads the outputs of each of the wheel speed sensors. At 52, the controller calculates a normalized wheel speed for each wheel to adjust for factors that would tend to make one wheel rotate faster than or slower even with good traction. This calculation will be discussed in more detail below. At 54, the controller calculates a difference, $\Delta\omega^N$, between the fastest normalized wheel speed and the slowest normalized wheel speed. At 56, the controller checks whether traction control is active and branches to either the flow chart of FIG. 2B or the flowchart of FIG. 2C accordingly.

FIG. 2B describes operations when traction control is not active. In other words, FIG. 2B is executed when there is good traction between the wheels and the surface. The controller sets the torque of the torque source at 58 based on a driver demand. The driver demand may be calculated, for example, based on a pedal position and a vehicle speed. At 60, the controller determines if traction control is to be entered. This can be done in a variety of ways, including by comparing wheel speeds to vehicle speed, and by comparing normalized wheel speeds to each other, i.e. by using $\Delta\omega^N$. Therefore, a flag is set at 62 indicating that the routine of FIG. 2C should be used the next time this method is executed. At 64, a counter that is used in the routine of FIG. 2C is initialized to zero.

Returning to step 60, the state of wheel slip can be used to notify other software components and takes advantage of that fact to calculate some values that will be useful in the routine of FIG. 2C. At 66, the controller the controller notifies the vehicle speed, $\omega_{veh}$, calculation. During non-slip conditions, the vehicle speed, $\omega_{veh}$, can be directly substituted with a normalized wheel speed. The exact substation method can vary depending on vehicle dynamics, but can be a direct substitution, such as the median wheel speed, or a combination such as the average wheel speed. At 68, the controller notifies the wheel normalizing logic. Normalizing wheel spin is necessary for the illustrated wheel comparison logic to function at a high fidelity. If one were to compare raw wheel speeds, it would be unclear if the cause of a difference is wheel speed was resulting from a slip event.

The wheel normalizing logic, referenced at 68, converts raw wheel speeds to a value of a reference (imaginary) tire, located at the center of the vehicle. This is necessary because the diameters of a vehicle's tires will differ from one another. This can result from a multitude of reasons, including manufacturing differences, tire wear, replacements, and purposeful mismatches, such as in the event of a spare tire The logic functions by determining states when raw tire speeds should match, but don't. The state must be chosen carefully to ensure vehicle dynamics do not incorrectly alter the normalization process. If one wheel is consistently faster than the average wheel speeds, the controller concludes that the diameter of that wheel is less than the others. Conversely, if one wheel is consistently slower than the average, the controller concludes that the diameter of that wheel is greater than the others. A secondary consideration must be made when normalizing wheel speeds. When a vehicle is turning, tire speeds naturally travel different distances, and thus rotate at different speeds. Again, this is not the result of slip, and is expected. Therefore, the vehicles geometry and dynamics are accounted for to properly adjust raw wheel speeds during situations where the vehicle is not traveling in a straight line.

FIG. 2C describes operations when traction control is active. In other words, FIG. 2C is executed when at least one of the wheels is slipping relative to the surface. At 66', the controller notifies the vehicle speed calculation logic to aid in accurately estimating the vehicle speed $\omega_{veh}$. When wheels are assumed to be slipping, a different method must be used than the corresponding step when the wheels are not slipping. At 66', $\omega_{veh}$ is calculated by adding a quantity proportional to a sensed longitudinal acceleration to the previously calculated $\omega_{veh}$. At 68, an average normalized wheel speed $\omega^N_{ave}$ is calculated. Note, depending on the architecture this average may represent a vehicle average, or it may represent an axle average. At 70, the controller sets the torque of the corresponding torque source based on a calculated wheel slip rate, $\omega^N_{ave}-\omega_{veh}$. At 72, the difference between the largest normalized wheel speed and the smallest normalized wheel speed, $\Delta\omega^N$, is compared to a second predetermined threshold value. If $\Delta\omega^N$ is less than the second threshold and remains less than the second threshold for a period of time, that indicates that traction has probably been regained. Note that this could be true even when $\omega_{ave}$ exceeds $\omega_{veh}$ due to possible accumulated errors in the calculation of $\omega_{veh}$. If $\Delta\omega N$ is less than the second threshold at 72, a counter is incremented at 74. Otherwise, the counter is decremented at 76. At 78, the counter is compared to a third predetermined threshold value. If the counter exceeds the value, a flag is set at 80 to indicate that traction control is no longer active and torque should be increased to driver demand. Alternative embodiments may adjust threshold 2 and/or threshold 3 based on driving conditions, such as drive mode, ambient temperature, pedal position, estimated mu, slip value, etc. Alternative embodiments may reset the counter to zero at 76. In another embodiment estimated vehicle speed can be used in conjunction with time, resulting in the exit criterion being based on distance traveled.

Figure 3:
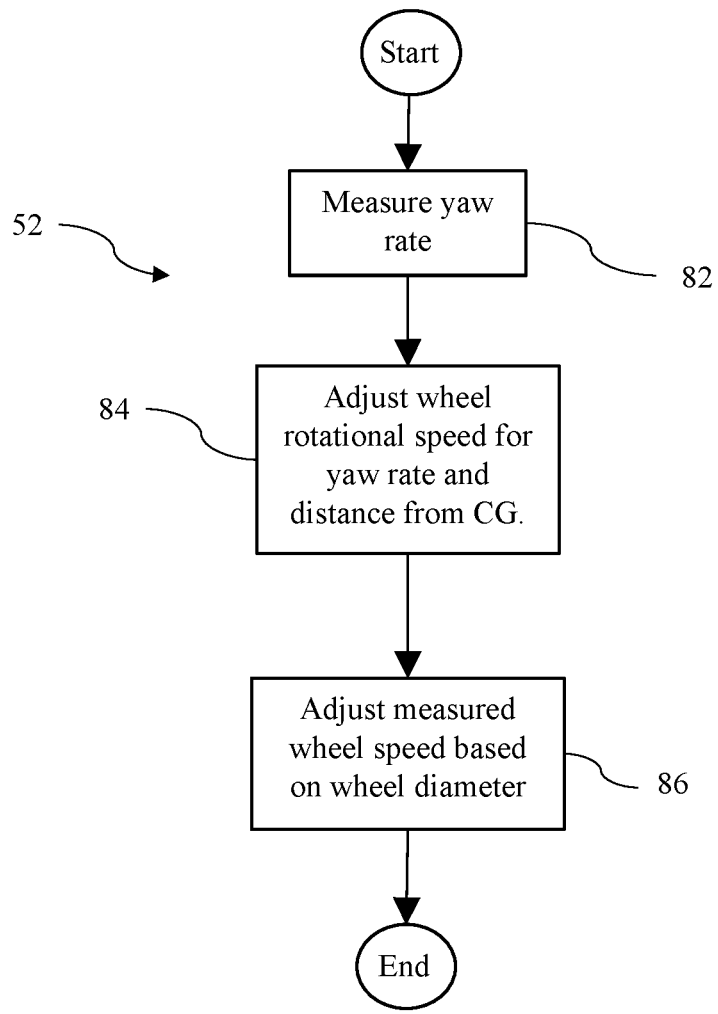
FIG. 3 is a flowchart for a subroutine of the method of FIGS. 2A-2C for normalizing wheel speeds.

FIG. 3 provides more detail about normalized wheels speeds which are calculated at 52. At 82, a yaw rate is measured by sensor 36. At 84, an adjustment is made to each measured wheel speed based on the yaw rate and the position of the wheel relative to a center of rotation. For example, if the vehicle is yawing toward the left, one would expect the wheels on the right to be rotating faster than the wheels on the left. To compensate for this, a quantity is subtracted from the measured wheels speeds of the right wheels and added to the wheel speeds of the left wheels. At 86, an adjustment is applied to each wheel speed based on the calculated wheel diameters. If a wheel has a smaller diameter than the other wheels, one would expect its rotational speed to be higher. To adjust for this, each wheel speed is multiplied by a factor that is proportional to the wheels diameter. The adjustments are not necessarily performed in the sequence shown. Other adjustments may be made is some embodiments. Some embodiments may omit an adjustment that is mentioned in FIG. 3.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method of controlling torque in a vehicle, the method comprising:
    distributing torque from at least one torque source to all wheels of the vehicle according to a commanded torque that is based on a driver demanded torque level;
    in response to detecting wheel slip, reducing the commanded torque from the driver demanded torque level; and
    after reducing the commanded torque and in response to a difference between a greatest normalized wheel speed and a least normalized wheel speed being less than a threshold, increasing the commanded torque to the driver demanded torque level.

2. The method of claim 1, further comprising, after reducing the commanded torque and before increasing the commanded torque, controlling the commanded torque based on wheel slip.

3. The method of claim 1, computing a normalized speed of each wheel by measuring a yaw rate and adding or subtracting a term proportional to the yaw rate to each measured wheel speed.

4. The method of claim 3, wherein the term is further based on a lateral distance between the respective wheel and a point about which the yaw rate is measured.

5. The method of claim 3, wherein computing the normalized speed of each wheel further comprises multiplying by a factor that is based on a sensed diameter of the respective wheel.

6. The method of claim 5, further comprising:
    in response to detecting absence of wheel slip, updating the sensed diameters based on the measured rotational speeds.

7. The method of claim 1, further comprising, waiting until the difference between the greatest normalized wheel speed and the least normalized wheel speed remains less than the threshold for a predetermined period of time before increasing the commanded torque level to the driver demanded torque.

8. The method of claim 7 wherein the predetermined period of time is adjusted in response to vehicle settings, driving conditions, and vehicle dynamics.

9. A method of controlling torque in a vehicle, the method comprising:
    distributing torque from at least one torque source according to a commanded torque based on a driver demanded torque level;
    in response to detecting wheel slip:
        updating a vehicle speed estimate based on a signal from an accelerometer;
        reducing the commanded torque from the driver demanded torque level based on a difference between an average of measured wheel rotational speeds for each wheel and the vehicle speed estimate; and
        after reducing the commanded torque and in response to a difference between a greatest normalized wheel speed and a least normalized wheel speed being less than a threshold, increasing the commanded torque to the driver demanded torque level.

10. The method of claim 9, further comprising computing a normalized speed of each wheel by measuring a yaw rate and adding or subtracting a term proportional to the yaw rate to each measured wheel speed.

11. The method of claim 10, wherein the term is further based on a lateral distance between the respective wheel and a point about which the yaw rate is measured.

12. The method of claim 10, wherein computing the normalized speed of each wheel further comprises multiplying by a factor that is based on a sensed diameter of the respective wheel.

13. The method of claim 12, further comprising:
in response to detecting absence of wheel slip, updating the sensed diameters based on the measured rotational speeds.

14. The method of claim 9, further comprising, waiting until the difference between the greatest normalized wheel speed and the least normalized wheel speed remains less than the threshold for a predetermined period of time or a predetermined distance before increasing the commanded torque level to the driver demanded torque.

15. The method of claim 14 wherein the predetermined period of time or predetermined distance is adjusted in response to vehicle settings, driving conditions, and vehicle dynamics.

16. A vehicle comprising:
a torque source;
four wheels;
gearing configured to distribute the torque to the four vehicle wheels; and
a processor programmed to:
command the torque source to produce a torque based on a driver demanded torque level;
in response to detecting wheel slip, reduce the commanded torque from the driver demanded torque level based on a degree of wheel slip; and
after reducing the commanded torque and in response to a difference between a greatest normalized wheel speed and a least normalized wheel speed being less than a threshold, increase the commanded torque to the driver demanded torque level.

17. The vehicle of claim 16, wherein the processor is further programmed to wait until the difference between the greatest normalized wheel speed and the least normalized wheel speed remains less than the threshold for a predetermined period of time or a predetermined distance before increasing the commanded torque level to the driver demanded torque.

18. The vehicle of claim 17 wherein the predetermined period of time or predetermined distance is adjusted in response to vehicle settings, driving conditions, and vehicle dynamics.

* * * * *